2,842,575
AMINOALKYL ESTERS OF 12-KETOOLEIC ACID AND 12-KETOELAIDIC ACID

Joseph Nichols, Princeton, and Edgar S. Schipper, New Brunswick, N. J., assignor to Ethicon, Inc., a corporation of New Jersey No Drawing. Application May 5, 1955
Serial No. 506,355

6 Claims. (Cl. 260—404)

This invention relates to esters of 12-ketooleic acid and 12-ketoelaidic acid, and more particularly relates to dialkylaminoalkyl esters of 12-ketooleic acid and 12-ketoelaidic acid.

Geometrically isomeric ricinoleic acid and ricinelaidic acid having the structural formula

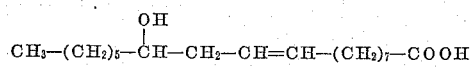

may be oxidized with chromic acid or with an aluminum secondary or tertiary alkoxide to provide geometrically isomeric 12-ketooleic acid and 12-ketoelaidic acid having the structural formula

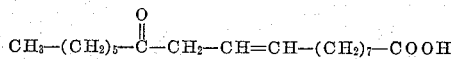

The novel dialkylaminoalkyl esters of 12-ketooleic acid and 12-ketoelaidic acid of this invention may be prepared by reacting equi-molar amounts of the acid and a lower alkyl chloroformate such as isobutylchloroformate, ethylchloroformate or propylchloroformate in the presence of an equi-molar amount of a lower aliphatic tertiary amine, an acylalkylcarbonate resulting from the reaction. The reaction is conducted at a temperature below 0° C. and in the presence of an inert solvent such as tetrahydrofuran or toluene. The addtion of about one to two moles of an alcohol and about one mole of a tertiary amine to the reaction mixture containing the acylalkylcarbonate results in the formation of the desired ester.

The novel esters of this invention have the following general structure:

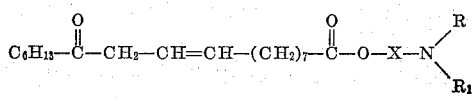

in which X is a lower alkylene straight or branched-chain radical and preferably having two or three carbon atoms and R and $R_1$ are each a lower alkyl radical and preferably a methyl or ethyl radical.

For the purpose of illustration, the following examples are set forth to illustrate the preparation of the novel compounds of the invention but are not to be construed as limiting the spirit of the invention or its scope.

EXAMPLE I

Beta-dimethylaminoethyl-12-ketooleate 4.11 grams of isobutylchloroformate were added dropwise to a stirred solution of 8.88 grams of 12-ketooleic acid and 3.06 grams of triethylamine in 300 ml. of dry toluene, the temperature during the addition being maintained at —5° to —10° C. After the addition was complete, the reaction mixture was stirred for thirty minutes and maintained at a temperature of —5° C. to —10° C. A hot solution of 5.4 grams of dimethylaminoethanol and 3.06 grams of triethylamine in 10 ml. of toluene was added to the stirred solution and the resulting suspension was heated and refluxed for thirty minutes. The reaction mixture was filtered and concentrated to dryness under reduced pressure. The resulting oily residue was dissolved in 100 ml. of 3-normal-hydrochloric acid and the solution was allowed to fall through a one foot column containing 250 ml. of ether. The acidic solution was treated with animal charcoal, filtered, and neutralized at 0° C. with a ten percent aqueous solution of potassium hydroxide. The oily product was extracted with two 250 ml. portions of ether and the combined ether layers were washed with water and dried over sodium sulphate. The drying agent was removed by filtration and the filtrate was concentrated under reduced pressure to a volume of 25 ml. and cooled to —50° C. The precipitate formed was removed rapidly by filtration and re-dissolved in 25 ml. of ether and cooled to —50° C. The precipitate was removed by rapid filtration and recrystallized three times in the same manner. 2.8 grams of a colorless oil were obtained.

Calculated for $C_{22}H_{41}O_3N$: Carbon=7.88%. Hydrogen=11.24%. Found: Carbon=71.54%. Hydrogen=11.25%.

EXAMPLE II

Beta-diethylaminoethyl-12-ketooleate 4.11 grams of isobutylchloroformate were added dropwise to a stirred solution of 8.88 grams of 12-ketooleic acid and 3.06 grams of triethylamine in 300 ml. of dry toluene, the temperature during the addition being maintained at —5° to —10° C. After the addition was complete, the reaction mixtures was stirred for thirty minute during which time it was maintained at a temperature of —5° to —10° C. A hot solution of 7.05 grams of diethylaminoethanol and 3.06 grams of triethylamine in 10 ml. of toluene was added to the stirred solution and the resulting suspension was heated and refluxed for thirty minutes. The reaction mixture was filtered and the filtrate was concentrated to dryness under reduced pressure. The oily residue obtained from the concentration was dissolved in 100 ml. of 3-normal-hydrochloric acid and the solution was allowed to fall through a 1-foot column containing 250 ml. of ether. The acidic solution was treated with animal charcoal, filtered, and neutralized at 0° C. with a ten percent aqueous solution of potassium hydroxide. The oily product was extracted with two 250 ml. portions of ether and the combined ether layers were washed with water and dried over sodium sulfate. The drying agent was removed by filtration and the ether was evaporated under reduced pressure. The residual oil was dissolved in 250 ml. of ether and decolorized three times with animal charcoal. 4.5 grams of a light yellow oil were obtained by removal of the ether from the decolorized solution.

Calculated for $C_{24}H_{45}O_3N$: Carbon=72.86%. Hydrogen=11.47%. Found: Carbon=73.14%. Hydrogen=11.52%.

EXAMPLE III

Gamma-diethylaminopropyl-12-ketoelaidate 4.11 grams of isobutylchloroformate were added dropwise to a stirred solution of 8.88 grams of 12-ketoelaidic acid and 3.06 grams of triethylamine in 300 ml. of tetrahydrofuran, the temperature during the addition being maintained at —5° to —10° C. After the addition was complete, the reaction mixture was stirred for thirty minutes and maintained at a temperature of —5° to —10° C. A solution of 7.9 grams of gamma-diethylaminopropanol and 3.06 grams of triethylamine in 10 ml. of tetrahydrofuran was added to the stirred solution and the resulting suspension was heated and refluxed for thirty minutes. The reaction mixture was filtered to remove insoluble triethylamine hydrochloride and the filtrate was concentrated to dryness under reduced pressure. The resulting oily residue was dissolved in 100 ml. of 3-normal-hydrochloric acid and the solution was allowed to fall through a 1 foot column containing 250 ml. of ether. The acidic solution was treated with animal charcoal, filtered and neutralized at 0° C. with a ten percent aqueous solution of potassium hydroxide. The oily product was extracted with two 250 ml. portions of ether and the combined ether layers were washed with water and dried over sodium sulfate. The drying agent was removed by filtration and the filtrate was evaporated under reduced pressure. The residual oil was distilled at a pressure of 0.04 mm. of mercury and 4.5 grams of a fraction which distilled at 200° C. to 205° C. were obtained. The fraction had a refractive index at 24° C. of 1.4629.

Calculated for $C_{25}H_{47}O_3N$: Carbon=73.30%. Hydrogen=11.57%. Found: Carbon=73.19%. Hydrogen=11.55%.

EXAMPLE IV

*Beta-diethylaminoethyl-12-ketoelaidate*

4.11 grams of isobutylchloroformate were added dropwise to a stirred solution of 8.88 grams of 12-ketoelaidic acid and 3.6 grams of triethylamine and 300 ml. of tetrahydrofuran, the temperature during the addition being maintained at −5° to −10° C. After the addition was complete, the reaction mixture was stirred for thirty minutes and maintained at −5° to −10° C. A solution of 7.05 grams of diethylaminoethanol and 3.06 grams of triethylamine in 10 ml. of tetrahydrofuran were added to the stirred solution and the resulting suspension was heated and refluxed for thirty minutes. The triethylamine hydrochloride in the reaction mixture was removed by filtration and the filtrate was concentrated to dryness under reduced pressure. The resulting oily residue was dissolved in 100 ml. of 3-normal-hydrochloric acid and the solution was allowed to fall through a 1-foot column containing 250 ml. of ether. The acidic solution was treated with animal charcoal, filtered, and neutralized at 0° C. with a ten percent aqueous solution of potassium hydroxide. The oily product was extracted with two 200 ml. portions of ether and the combined ether layers were washed with water and dried over sodium sulfate. The drying agent was removed by filtration and the ether was removed from the filtrate by evaporation under reduced pressure. The residual oil was distilled at a pressure of 0.04 mm. of mercury and 7.0 grams of distillate which boiled at 200° C. to 205° C. were obtained.

Calculated for $C_{14}H_{45}O_3N$: Carbon=72.86%. Hydrogen=11.47%. Found: Carbon=72.42%. Hydrogen=11.06%.

The novel compounds of this invention are highly effective at low concentration in killing microorganisms or preventing or inhibiting their growth.

EXAMPLE V

The compounds prepared according to Examples I to IV were tested for bactericidal activity by the following serial dilution method:

The compounds were sterilized by exposure to propylene oxide for three days and 0.5 milliliter of sterile aqueous solution containing twenty micrograms of the compound per milliliter of solution was added to 9.5 milliliters of sterile yeast beef broth, the broth then being serially diluted with additional sterile broth to provide solutions of five milliliters total volume containing 500, 100, 50, 1, 0.1, and 0.01 micrograms of compound per milliliter of solution. Three tubes, each containing 4.5 milliliters of sterile broth, were inoculated with 0.1 milliliter of a mature broth culture of *Bacillus subtilis*, *Diplococcus pneumoniae* III, and *Micrococcus pyogenes* var. *aureus*, respectively, and the inoculated tubes were incubated at 37° C. for 24 hours. Three tubes, each containing 4.5 milliliters of sterile broth, were each inoculated with 0.1 milliliter of an incubated culture and incubated at 37° C. for 24 hours. Progressive series of dilutions ranging from 1 to 100, to 1 to 1 billion, were prepared by dilution of the contents of the three tubes with sterile broth and 0.1 milliliter of each dilution was transferred into 4.5 milliliters of sterile broth and incubated at 37° C. for 24 hours. 0.1 milliliter of the contents of the tubes representing the highest dilution which initiated growth of the organisms were each transferred into each of the tubes containing the compounds to be tested and this was followed by incubation of the tubes at 37° C. for 48 hours. Bacterial growth was inhibited in all instances at a concentration of not greater than ten micrograms per milliliter for *B. subtilis*, 500 micrograms per milliliter for *D. pneumoniae* III, and 50 micrograms per milliliter for *M. pyogenes* var. *aureus*.

The compounds prepared according to Examples I to IV were tested for activity against *Mycobacteria tuberculosis* H37Rv according to the method of A. W. Frisch and M. S. Tarshis, American Review of Tuberculosis, vol. 64, page 551 (1951). Growth of *Mycobacteria tuberculosis* H37Rv was inhibited in all instances at a concentration of not greater than one hundred micrograms per milliliter.

The compounds prepared according to Examples I to IV were tested for activity against *Coccidioides immitis* by the serial dilution method given by the following procedure:

The compounds were sterilized by exposure to propylene oxide for three days and 0.25 milliliter of sterile aqueous solution containing twenty micrograms of compound per milliliter of solution was added to 4.5 milliliters of sterile Mycophil broth, the broth then being serially diluted with additional sterile broth to provide solutions of five milliliters total volume containing 500, 100, 10, 1, 0.1, and 0.01 micrograms of compound per milliliter of solution. One milliliter of a seventy-two hour Mycophil broth culture of *Coccidioides immitis* was added to ninety-nine milliliters of sterile Mycophil broth and 0.2 milliliter of diluted culture was added to each of the serial dilutions containing the test compound and the inoculated tubes were incubated at 25° C. for five days. Growth was inhibited in all instances at a concentration of not greater than one hundred micrograms per milliliter.

What is claimed is:

1. A compound selected from the group consisting of geometrically isomeric dialkylaminoalkyl esters of 12-ketooleic acid and 12-ketoelaidic acid having the formula:

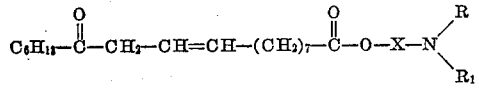

in which X is a lower alkylene radical and R and $R_1$ are each a lower alkyl radical.

2. A compound according to claim 1 in which X is a lower alkylene radical having at least two but not more than three carbon atoms and R and $R_1$ are each an alkyl radical having not more than two carbon atoms.

3. Beta-dimethylaminoethyl-12-ketooleate.
4. Beta-diethylaminoethyl-12-ketooleate.
5. Gamma-diethylaminopropyl-12-ketoelaidate.
6. Beta-diethylaminoethyl-12-ketoelaidate.

References Cited in the file of this patent

UNITED STATES PATENTS

| | | |
|---|---|---|
| 2,430,004 | De Groote | Nov. 4, 1947 |
| 2,623,888 | Nichols | Dec. 30, 1952 |

OTHER REFERENCES

Vaughn, Jr.: J. Am. Chem. Soc., vol. 73 (1951), page 3547.

Emery et al.: J. Am. Soc. (1950), pages 1443–1460.

UNITED STATES PATENT OFFICE
CERTIFICATE OF CORRECTION

Patent No. 2,842,575                      July 8, 1958

Joseph Nichols et al.

It is hereby certified that error appears in the printed specification of the above numbered patent requiring correction and that the said Letters Patent should read as corrected below.

Column 2, line 19, for "7.88%" read -- 71.88% --; line 30, for mixtures" read -- mixture --; column 3, line 50, for "$C_{14}H_{45}O_3N$" read -- $C_{24}H_{45}O_3N$ --.

Signed and sealed this 16th day of September 1958.

(SEAL)
Attest:

KARL H. AXLINE                              ROBERT C. WATSON

Attesting Officer                             Commissioner of Patents